United States Patent [19]

Rahn

[11] Patent Number: 4,966,437

[45] Date of Patent: Oct. 30, 1990

[54] FAULT-TOLERANT ANTI-REFLECTIVE COATINGS

[75] Inventor: John P. Rahn, Canoga Park, Calif.

[73] Assignee: Litton Systems, Inc., Beverly Hills, Calif.

[21] Appl. No.: 183,569

[22] Filed: Apr. 19, 1988

[51] Int. Cl.$^5$ .............................................. G02B 1/10
[52] U.S. Cl. ..................................... 350/166; 350/164; 156/662; 427/162; 427/165; 427/419.3
[58] Field of Search ................. 350/166, 320, 164, 1.6; 427/160, 162, 164, 165, 166, 419.3; 156/657, 662, 667

[56]  References Cited

U.S. PATENT DOCUMENTS

| | | | |
|---|---|---|---|
| 3,637,294 | 1/1972 | Berthold | 350/166 |
| 3,781,090 | 12/1973 | Sumita | 350/166 |
| 3,922,774 | 12/1975 | Lindmayer et al. | 29/572 |
| 3,978,273 | 8/1976 | Groth | 428/434 |
| 3,982,964 | 9/1976 | Lindmayer et al. | 136/89 |
| 3,984,581 | 10/1976 | Dobler et al. | 427/35 |
| 4,055,442 | 10/1977 | Crosher | 136/89 |
| 4,130,672 | 12/1978 | Onoki et al. | 427/167 |
| 4,147,409 | 4/1979 | Apfel | 350/166 |
| 4,168,113 | 9/1979 | Chang et al. | 351/166 |
| 4,196,246 | 4/1980 | Takayama et al. | 428/213 |
| 4,239,810 | 12/1980 | Alameddine et al. | 427/75 |
| 4,272,641 | 6/1981 | Hanak | 136/249 |
| 4,389,534 | 6/1983 | Winterling | 136/256 |
| 4,431,708 | 2/1984 | Carver et al. | 428/641 |
| 4,494,873 | 1/1985 | Perlmutter et al. | 356/350 |
| 4,543,133 | 9/1985 | Mukai | 148/1.5 |
| 4,583,822 | 4/1986 | Southwell | 427/162 |
| 4,591,189 | 5/1986 | Holmen et al. | 283/83 |
| 4,592,129 | 6/1986 | Legge | 29/572 |
| 4,592,921 | 6/1986 | Hieber et al. | 427/10 |
| 4,666,250 | 5/1987 | Southwell | 350/166 |
| 4,668,335 | 5/1987 | Mockler et al. | 156/643 |
| 4,681,795 | 7/1987 | Tuckerman | 428/209 |
| 4,689,873 | 9/1987 | Kramer | 437/2 |
| 4,694,115 | 9/1987 | Lillington et al. | 136/256 |
| 4,725,109 | 2/1988 | Wank et al. | 350/166 |
| 4,770,496 | 9/1988 | Mahlein | 350/166 |
| 4,778,251 | 10/1988 | Hall et al. | 350/166 |

Primary Examiner—Bruce Y. Arnold
Assistant Examiner—R. D. Shafer
Attorney, Agent, or Firm—Roy L. Brown

[57] ABSTRACT

A method for producing a narrow band anti-reflective film on a substrate, and the film produced by that method.

Uses the concept of considering a multifilm dielectric to be an equivalent two-film dielectric, then removing a predetermined thickness of the outer, lower dielectric, film to cause the complete multifilm to become anti-reflective.

When limited numbers of film materials are available, uses an EIL or effective index layer concept to obtain a predetermined index of refraction which improves the tolerance of the reflection of an anti-reflective film to film thickness errors.

6 Claims, 3 Drawing Sheets

FAULT-TOLERANT ANTI-REFLECTIVE COATINGS

BACKGROUND OF THE INVENTION

In the field of electro-optics, a non-reflective coating is frequently needed. Such coating should, preferably, be completely non-reflecting to an arriving beam.

To reduce mode coupling and resonator losses in ring laser gyros having intracavity elements such as Faraday Rotators, it is necessary to reduce reflections from such elements, and preferably to reduce reflections to zero. In designing an anti-reflective coating, one might specify both substrate and dielectric film materials having certain required indices of refraction, and such materials might be unavailable. In the real world there are very few low-loss coating materials and even fewer materials that are also sufficiently stable in the environment of a ring laser gyro.

In a multisensor, for example, the Faraday Cell may be fabricated of SF-57, a Schott glass with a high Verdet constant. A non-reflective or anti-reflective coating is deposited on the surfaces of the Faraday Cell.

A typical anti-reflective coating on the Faraday Cell, to prevent reflections of laser beams back into the ring laser, may be a multifilm dielectric of silica, $SiO_2$, and titania, $TiO_2$. The reflectivity of the multifilm coating depends upon the thicknesses and the relative thicknesses of the two films. For a general discussion of the reflectivity of multifilms, see, "Principles of Optics," fifth edition, by Max Born and Emil Wolf, Pergamon Press, 1975, pages 59 et. seq.

Retroscatter from surfaces in a ring laser gyro induces frequency and intensity variations of the individual counter propagating beams. Both the frequency variation, which is sinusoidal with a frequency equal to the beat frequency between the beams, and the intensity variation produce a locking of the two beam frequencies, and the ring laser gyro can no longer measure angular rotation.

BRIEF DESCRIPTION OF THE INVENTION

A plurality of films of interleaved silica and titania, particularly if the total thickness of the multifilm structure is kept below a predetermined value, may be made completely anti-reflective. Practically, however, when the films are fabricated on their substrate, the films are not exactly the correct thickness to cause the structure to be anti-reflective. To make them anti-reflective, a portion of the outer film must be removed, perhaps by chemical etching or milling.

The reflectivity of the multifilm is extremely sensitive to the thickness of the material with the higher index of refraction, titania. The reflectivity of the multifilm is not so sensitive to the thickness of the material with the lower index of refraction, silica. An almost perfect anti-reflective multifilm may be fabricated on SF-57 using only two films, an inner film of titania and an outer film of silica. The silica is then etched to a critical thickness that causes the multifilm to become almost completely anti-reflective.

It is therefore a feature and an object of this invention to provide means and method for making an anti-reflective coating using materials having a limited range of refractive indices.

It is another object of this invention to provide means and method for making such an anti-reflective surface suitable for use in a ring laser gyro.

Other objects will become apparent from the following description, taken together with the accompanying drawings.

DETAILED DESCRIPTION OF THE PREFERRED EMBODIMENT OF THE INVENTION

Figure 1:
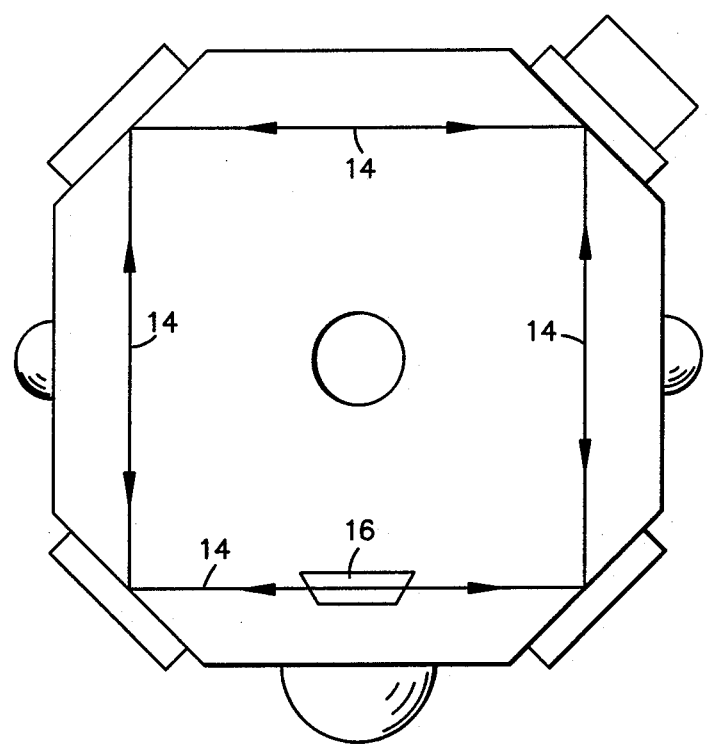
FIG. 1 is a schematic drawing of a ring laser multisensor showing a Faraday Cell positioned therein and having anti-reflective coatings thereon.

A plurality of films 10 of interleaved low and high index of refraction material, for example silica and titania, particularly if the total thickness of the multifilm structure is kept below a predetermined value, may by this invention be made completely anti-reflective. Practically, however, when the films are fabricated on their substrate, available manufacturing tolerances when depositing the films produce films that are not exactly the correct thickness to cause the structure to be anti-reflective. To modify them to be more anti-reflective, a portion of the outer film must be removed, perhaps by chemical etching or milling.

The reflectivity of the multifilm is extremely sensitive to the thickness of the material with the higher index of refraction, titania. The reflectivity of the multifilm is not so sensitive to the thickness of the material with the lower index of refraction, silica. An almost perfect anti-reflective multifilm may be fabricated on SF-57 using only two films, an inner film of high index of refraction material and an outer film of low index of refraction material. The outer film is then etched to a critical thickness that causes the multifilm to become almost completely anti-reflective.

In a multisensor 12 the laser beams 14 travel in both directions through a Faraday Cell 16. It is essential that the arriving beams do not reflect, for such reflection would introduce optical loss. Optical loss produces enhanced angular noise in the ring laser gyro output signal, thereby reducing navigation system alignment accuracy.

The effect of differences of polarization on the performance of the antireflection coating is minimal if the incidence angle on the intracavity element is less than ten degrees. Thus, in ring laser gyro apparatus, the anti-reflective coating of this invention operates equally well to both p and s polarizations.

The design of an anti-reflective surface film is typically optimum for neither p or s beams but they are almost optimum for both polarizations with a difference in reflectivity on the order of only ten parts per million for angles of incoming light beams within ten degrees of normal to the surface of the film.

In the following calculations, the absorptive loss index, "k," has been neglected in computing the reflectivity, "R." $k<<1$ for the usual titania and silica films, and thus its inclusion in the equations does not significantly affect the design of the anti-reflective multifilms. However, if k has a value that is as large as 2% of the index of refraction, "n," k must be considered in calculating the film thicknesses.

It has been found that film thickness errors in the range of +/−0.05 optical radians, from the designed thickness for perfect anti-reflection, produce less than 250 parts per million reflection loss. The reasons for stating the film thickness in radians of phase shift instead of Angstroms is that the radian measure is independent of wavelength for a given set of indices of refraction. The physical thickness, $t_i$, of the "ith" film in Angstroms is, $$t_i = t\lambda / \{2\pi[n_i^2 - n_o^2 \sin^2(\theta_o)]^{\frac{1}{2}}\} \quad (1)$$

where "$\lambda$" is the vacuum wavelength of the beam, "$n_i$" is the index of refraction of the film, "$n_o$" is the index of refraction of the contiguous medium, "$\theta_o$" is the angle of incidence of the beam in that medium, and "t" is the thickness in optical phase units.

It is instructive to design a single anti-reflective film which would be useful if a material of the proper index of refraction were available. Equation (2) determines the film index of refraction for perfect anti-reflection of an s polarized beam. Equation (3) is for a p polarized beam.

$$n_{1s} = [n_o^2 \sin^2\theta_o + n_o n_s \cos(\theta_o)\cos(\theta_s)]^{\frac{1}{2}} \quad (2)$$

for s polarization, $$n_{1p} = \{n_o n_s / [(2\cos(\theta_o)\cos(\theta_s)]\}^{\frac{1}{2}} \{1 + [1 - 4n_o\sin^2(\theta_o) \cdot \cos(\theta_o)\cos(\theta_s)/n_s]^{\frac{1}{2}}\}^{\frac{1}{2}} \quad (3)$$

for p polarization, and where the subscripts o and s refer to the parameters of the contiguous medium and the substrate, respectively, and where $\theta_o$ and $\theta_s$ are the angles relative to the normal of the interface and $n_o$ and $n_s$ are the indices of refraction.

In general, materials with the correct index of refraction to satisfy equations (2) and (3) are not available.

When two films of different indices of refraction are used, both the real and imaginary parts of the complex reflection coefficient of one angle of incidence for any substrate to beams of one polarization. For example, it may be made anti-reflective to the s beam but not the p beam. Alternatively it may be made anti-reflective to the p beam but not the s beam. The required thickness $t_2$ and $t_1$ are determined from equations (4) and (5).

$$t_2 = \tan^{-1}\{[(p_o - p_s)(p_1^2 - p_o p_s)p_2^2] / [(p_2^2 p_o - p_1^2 p_s)(p - s p_o - p_2^2)]\}^{\frac{1}{2}} \quad (4)$$

$$t_1 = \tan^{-1}\{[\tan(t_2)p_1(p_s p_o - p_2^2)] / [p_2(p_1^2 - p_o p_s)]\} \quad (5)$$

where $$p_i = n_i \cos(\theta_i) \quad \text{(s polarized) for } i = 1,2 \quad (6)$$

and $$p_i = \cos(\theta_i)/n_i \quad \text{(p polarized) for } i = 1,2 \quad (7)$$

and the numerical subscripts refer to the film parameters with the lowest number referring to the film closest to the contiguous medium.

Note that the requirement for zero reflectivity of both the p and the s polarized beams are not simultaneously satisfied by two films. To design an anti-reflective multifilm for circularly polarized light, one designs such multifilms for both s and p polarization and averages the film thicknesses between those required for s polarization and those required for p polarization. For incidence angles of less than ten degrees, both p and s polarizations will have nearly zero reflection.

The sensitivity of the reflectance, R, to errors in thickness of the films may be computed. Because the reflectivity is a positive numeral, it is expected that the slope of the reflectivity as a function of film thickness, index of refraction, angle of incidence, beam wavelength, substrate index of refraction, index of refraction of the contiguous medium, at the proper film thicknesses, indices of refraction, angles of incidence, beam wavelengths, substrate index of refraction, and index of refraction of the contiguous medium will be zero. Therefore, the reflectivity may be expanded in a Taylor's series, keeping the first and second order terms (See equation (8)).

$$R = (1/2) \sum_{i,j} [\partial^2 R / \partial t_{ia} t_j](t_i - t_{io})(t_j - t_{jo}) \quad (8)$$

where the sum is taken over the range, $i = 1,2$ and $j = 1,2$ and the second derivative factor is evaluated at the designed thicknesses of the films, $t_1$ and $t_2$. $t_{1o}$ and $t_{2o}$ are the ideal values of the film thicknesses. When there are more than two films, namely m films, in a multifilm, the $t_i$ and $t_j$ factors are calculated over all of the factors 1 to m.

In a typical situation, only a few of the thicknesses will be in error. To determine the thickness error permitted to obtain 1000 parts per million reflectivity when only one of the actual thicknesses differs from its designed thickness, one substitutes numerals into equation (8) and takes the partial derivative with respect to that particular thickness, using equation (9).

$$t_i = \{0.002 / [\partial^2 R / \partial t_i^2]\}^{\frac{1}{2}} \quad (9)$$

Note from equation (8) that the reflectivity is proportional to the square of the error in thickness so that if the thickness error is reduced by one-half, the reflectivity is reduced by one-quarter.

To determine the correction needed in the outer film to reduce the reflectivity caused by an error in thickness of an inner film, one must examine the mixed partial second derivative terms of equation (8). The thickness of the outer film that produces a minimum reflectivity is the thickness at which the differential of the reflectivity with respect to the outer film thickness becomes zero. The equation for that zero derivative when there are only two films in the multifilm is given at (10).

$$dR/dt_1 = (\partial^2 R / \partial t_1^2)(t_1 - t_{1o}) + (\partial^2 R / \partial t_1 \partial t_2)(t_2 - t_{2o}) = 0 \quad (10)$$

The second derivatives are evaluated at the ($t_{1o}$, $t_{2o}$) coordinates where $R = 0$. Solving, the equation for $(t_1 - t_{1o})$ produces $$(t_1 - t_{1o}) = -[(\partial^2 R / \partial t_1 \partial t_2)/(\partial^2 R / \partial t_1^2)](t_2 - t_{2o}). \quad (11)$$

in radians which can be converted to Angstroms. The coefficient on the right side of the equation (11) is called herein SHAV$_{12}$ which is the number of Angstroms that must be milled from the outer film (1) to correct for a one Angstrom surplus in the thickness of the inner film (2). If the error is negative, one must add to the outer film thickness to reduce the reflectivity. In practical terms, one always fabricates the outer film sufficiently thick that material must always be removed therefrom to adjust the reflectivity according to this invention. Similarly, in a 3-film anti-reflective coating, $SHAV_{13}$ is the amount of thickness that must be removed from the outer film to correct for one Angstrom surplus in the thickness of the third film. All of the SHAV functions will be in the form $SHAV_{1j}$ which is the amount of thickness that must be removed from the outer film to correct for one Angstrom surplus in the thickness of the "jth" film.

It is informative to consider the design of a three film multifilm. If the geometric mean of the indices of refraction of the materials in the multifilm is higher than the index of refraction of the substrate, it is important in the multifilm to place the film having the highest index of refraction next to the substrate and to use a film having the lowest index of refraction as the outer film 18.

To design a threefilm, two material, multifilm to produce a reflectivity less than 200 parts per million, one determines the first and second derivatives of reflectivity with respect to thickness of the films. One then substitutes the assumed thicknesses into the equations and, using the first derivatives of reflectivity with respect to thickness as constants, the following equations (12), (13), and (14) are solved simultaneously to obtain the correction to be made to the assumed thicknesses of films 1, 2, and 3.

$$dR/dt_1 = (\partial^2 R/\partial t_1^2)(t_1 - t_{1o}) + (\partial^2 R/\partial t_1 \partial t_2)(t_2 - t_{2o}) + (\partial^2 R/\partial t_1 \partial t_3)(t_3 - t_{3o}) \quad (12)$$

$$\overline{dR/dt_2} = (\partial^2 R/\partial t_1 \partial t_2)(t_1 - t_{1o}) + (\partial^2 R/\partial t_2^2)(t_2 - t_{2o}) + (\partial^2 R/\partial t_2 \partial t_3)(t_3 - t_{3o}) \quad (13)$$

$$dR/dt_3 = (\partial^2 R/\partial t_1 \partial t_3)(t_1 - t_{1o}) + (\partial^2 R/\partial t_2 \partial t_3)(t_2 - t_{2o}) + (\partial^2 R/\partial t_3^2)(t_3 - t_{3o}) \quad (14)$$

where "$t_{io}$" are the design values of the "$t_i$"'s to reduce the reflectivity from its value at the manufactured thicknesses to zero.

The equations (12), (13) and (14) are solved simultaneously for $$\Delta t_i = t_i - t_{io}. \quad (15)$$

to obtain a new set of $t_1$, $t_2$, $t_3$ which give lower reflectivity than $t_{1o}$, $t_{2o}$, $t_{3o}$. They are used in the numerical design process wherein $SHAV_{13}$ and $SHAV_{12}$ are defined the same as for the two film $SHAV_{12}$, and the values for $t_i$ can be corrected using the equations $$t_{io} = t_i - \Delta t_i. \quad (16)$$

By repeated iterations, zero reflectivity is approached.

After the reflectivity to a first polarization of light, (say p polarization) is reduced to the order of one part per million, both the tolerances to index of refraction and to the reflectivity to the other polarization (say s polarization) are determined.

To obtain a formula for an estimate of the reflectivity, when the actual errors in thicknesses and indices of refraction are known, one expands the reflectivity, R, in a Taylor series about zero.

$$R = (\partial^2 R/\partial t_1 \partial t_2)\Delta t_1 \Delta t_2 + (\partial^2 R/\partial t_1^2)(\Delta t_1^2/2) + (\partial^2 R/\partial t_2^2)(\Delta t_2^2/2) \quad (17)$$

To determine the sensitivity of the reflectivity to a small change, $\Delta t_1$ in $t_1$, take the derivative of R in equation (17) with respect to $\Delta t_1$.

$$dR/d(\Delta t_1) = (\partial^2 R/\partial t_1 \partial t_2)\Delta t_2 + (\partial^2 R/\partial t_1^2)\Delta t_1. \quad (18)$$

To determine the required thickness change of $t_1$ for a minimum R, set equation (18) equal to zero, and solve for $t_1$.

$$t_{1R\ min} = -\{(\partial^2 R/\partial t_1 \partial t_2)/(\partial^2 R/\partial t_1^2)\}\Delta t_2 \quad (19)$$

But the portion of equation (19) within the braces { } is identically equal to $SHAV_{12}$, and $$t_{1R\ min} = -SHAV_{12}\Delta t_2 \quad (20)$$

Rewriting equations (17) and (19) to simplify algebraic manipulation, $$R = A\Delta t_1 \Delta t_2 + B\Delta t_1^2/2 + C\Delta t_2^2/2 \quad (17A)$$

and $$t_{1R\ min} = -(A/B)\Delta t_2 = -SHAV_{12}\Delta t_2 \quad (19A)$$

Substituting equation (19A) into equation (17A), $$R = -(A^2/B)\Delta t_2^2 + (BA^2/2B^2)\Delta t_2^2 + (C/2)\Delta t_2^2 \quad (17B)$$

Cancelling and factoring, $$R = (\Delta t_2^2/2)\{-2B(A^2/B^2) + (B)(A^2/B^2) + C\} \quad (17C)$$

$$R = (\Delta t_2^2/2)\{(-B(A^2/B^2) + C\} \quad (17D)$$

$$R = (\Delta t_2^2/2)\{(C - SHAV_{12}^2 B\} \quad (17E)$$

or $$R_{min} = \{(\partial^2 R/\partial t_2^2) - SHAV_{12}^2(\partial^2 R/\partial t_1^2)\}(\Delta t_2^2/2)$$

Definition of "tolerance", "TOL":

For a given amount of allowed reflectivity error, $\Delta R_j$, due to just one film thickness error, from equation (17), the thickness tolerance for $\Delta R_j$ is $$\Delta t_j = \{2\Delta R_j/[\partial^2 R/\partial t_j^2]\}^{\frac{1}{2}}.$$

In table 1, $\Delta R$ is chosen as $\Delta R_j = 0.001$ and the $+/-$ values are the thickness tolerances corresponding to $\Delta R_j = 0.001$.

$$TOL_2 = \{0.002/\partial^2 R/\partial t_2^2\}^{\frac{1}{2}} \text{ (in Angstroms)} \quad (23A)$$

and $$TOL_1 = \{0.002/\partial^2 R/\partial t_1^2\}^{\frac{1}{2}} \text{ (in Angstroms)} \quad (23B)$$

Factoring $\partial^2 R/\partial t_2^2$ from equation 21, $$R_{min} = (\partial^2 R/\partial t_2^2)\{1 - SHAV_{12}^2 \cdot [(\partial^2 R/\partial t_1^2)/(\partial^2 R/\partial t_2^2)]\}(\Delta t_2^2/2) \quad (24)$$

Substituting $TOL_1$ AND $TOL_2$ into the equation (24), $$R_{min} = \{\Delta t_2^2/TOL_2^2\}\{1-[SHAV_{12}^2 TOL_2^2/TOL_1^2]\}*(1000) \text{ in ppm./(Angstrom)}^2. \quad (24A)$$

To design a two film anti-reflective apparatus, then, $TOL_2$ should be large, $TOL_1$ should be small, and $SHAV_{12}$ should be large.

For a typical inner film of $TiO_2$, $n_2 = 2.30 +/- 0.11$, and an outer film of $SiO_2$, $n_1 = 1.48 +/- 0.05$, for various thicknesses, calculated as recited above, the reflectivity is very low: on the order of fourteen to sixteen parts per million.

The following Table 1 is presented for substrate indices of refraction ranging from 1.50 to 2.00. Table 1 was calculated using references and definitions from the book, Born, Max and Wolf, Emil, *PRINCIPLES OF OPTICS*, 5th Ed., Pergamon Press, London, 1975.

Equation (24B) is a sample calculation wherein $n_1 = 1.48$, $n_2 = 2.30$, $SHAV_{12} = 0.05$, $TOL_1 = 52$ Angstroms, $TOL_2 = 61$ Angstroms, and $n_s = 1.84$.

$$R_{min}/(\text{Angstrom})^2 = (1000)(1/61^2)\{1-[(0.05)(61/52)]^2\} = 0.27 \text{ ppm/(Angstrom)}^2. \quad (24B)$$

TABLE 1

| SUBSTRATE INDEX OF REFRACTION | THICKNESS OF OUTER FILM NUMBER ONE $+/- TOL_1$ | THICKNESS OF INNER FILM NUMBER TWO $+/- TOL_2$ | $SHAV_{12}$ |
|---|---|---|---|
| 1.50 | 1441 +/- 52 | 200 +/- 31 | 0.49 |
| 1.52 | 1429 +/- 52 | 204 +/- 32 | 0.45 |
| 1.54 | 1416 +/- 52 | 207 +/- 33 | 0.42 |
| 1.56 | 1404 +/- 52 | 210 +/- 34 | 0.38 |
| 1.58 | 1393 +/- 52 | 213 +/- 36 | 0.35 |
| 1.60 | 1381 +/- 52 | 215 +/- 37 | 0.32 |
| 1.62 | 1370 +/- 52 | 218 +/- 38 | 0.29 |
| 1.64 | 1359 +/- 52 | 221 +/- 40 | 0.26 |
| 1.66 | 1348 +/- 52 | 223 +/- 41 | 0.24 |
| 1.68 | 1337 +/- 52 | 225 +/- 43 | 0.21 |
| 1.70 | 1327 +/- 52 | 227 +/- 45 | 0.19 |
| 1.72 | 1317 +/- 52 | 229 +/- 47 | 0.17 |
| 1.74 | 1307 +/- 52 | 231 +/- 49 | 0.14 |
| 1.76 | 1297 +/- 52 | 233 +/- 51 | 0.12 |
| 1.78 | 1287 +/- 52 | 234 +/- 53 | 0.11 |
| 1.80 | 1277 +/- 52 | 235 +/- 56 | 0.09 |
| 1.82 | 1268 +/- 52 | 236 +/- 58 | 0.07 |
| 1.84 | 1258 +/- 52 | 237 +/- 61 | 0.05 |
| 1.86 | 1249 +/- 52 | 238 +/- 64 | 0.04 |
| 1.88 | 1240 +/- 52 | 238 +/- 68 | 0.02 |
| 1.90 | 1231 +/- 52 | 238 +/- 72 | 0.01 |
| 1.92 | 1222 +/- 52 | 238 +/- 76 | 0.00 |
| 1.94 | 1213 +/- 52 | 237 +/- 80 | 0.01 |
| 1.96 | 1204 +/- 52 | 236 +/- 86 | 0.02 |
| 1.98 | 1195 +/- 52 | 234 +/- 92 | 0.03 |
| 2.00 | 1187 +/- 52 | 231 +/- 98 | 0.04 |

By changing $n_2$ to $n_2 = 2.05$, for a substrate index of refraction of 1.84, we get $SHAV_{12} = 0.28$, $TOL_1 = 52$, $TOL_2 = 142$, the reflectivity per (Angstrom)$^2$ of $t_2$ error may be further reduced to the calculation of equation (24C).

$$R_{min}/(\text{Angstrom})^2 = (1000)(1/142^2)\{1-[(0.28)(142/52)]^2\} = -0.03 \text{ ppm/(Angstrom)}^2. \quad (24C)$$

But a material having an index of refraction equal to 2.05 is not readily available. Thus, according to this invention, a concept of an effective index layer, hereinafter called "EIL" is introduced. A reflective surface 16 may have as many as twenty dielectric films. An optical apparatus may be designed, for example, to reflect a beam of a particular frequency and to be anti-reflective to all other beams. The apparatus may be designed to transmit beams, and an anti-reflective coating is important to prevent reflections from an optical surface. The EIL is a concept wherein, for the purpose of designing an anti-reflective surface, a multi-film apparatus may be treated as if it were a two-film apparatus. The combination of multiple films, each of a different thickness and index of refraction, may be treated as a single low index of refraction outer surface, with only a second or inner film having an equivalent thickness and equivalent index of refraction. Thus, the equivalent index of refraction may be tailored to make possible an anti-reflective surface with substantially no reflection.

William H. Southwell, in an article entitled, "Coating Design Using Very Thin High- and Low-index Layers", *Applied Optics*, Vol. 24, No. 4, Feb. 15, 1985, describes the use of an equivalent index of refraction and an equivalent thickness for a multi-film in designing an optical coating. Southwell derives equations for the thicknesses and indices of refraction of two films which produce a predetermined equivalent thickness and index of refraction. For a two film coating, Southwell derives that the equivalent index of refraction N equals $$N = \{(n_H^2 t_H + n_L^2 t_L)/(t_H + t_L)\}^{\frac{1}{2}}, \quad (25)$$

factoring $n_H$ from the numerator and denominator and cancelling, and defining a new factor, "r" $= t_L/t_H$, then $$N = \{(n_H^2 + rn_L^2)/(1+r)\}^{\frac{1}{2}} \quad (25A)$$

and $$t_L = T - t_H, \quad (26)$$

where N is the equivalent index of refraction and T is the equivalent thickness of the multifilm wherein $t_H$ is the thickness of the film having the higher index of refraction, $n_H$, $t_L$ is the thickness of the film having the lower index of refraction, $n_L$.

Southwell then proceeds to use the concept to develop a broadband antireflection coating for glass.

The applicant herein uses the concepts of equivalent index of refraction and equivalent thickness of film over a very narrow band of wavelengths, for example a bandwidth typical of a ring laser gyro, to reduce the reflectivity to zero at that bandwidth.

Consider, for example, an outer film 18 having an index of refraction $n_1 = 1.48$ used with an equivalent inner film (which might be a large number of stacked films) index of refraction, $n_2 = 2.05$. $n = 2.05$ was chosen because it produces a very low reflectance. Assume $SHAV_{12} = 0.28$, $TOL_1 = 52$, and $TOL_2 = 142$. Then the minimum reflectivity per (Angstrom)$^2$ is shown in equation (24C). Present well known materials can be stacked to obtain any desired n between the lower and higher indices of refraction, $n_L$ and $n_H$. For $TiO_2$ and $SiO_2$ the range is 1.48 to 2.30.

The use of very thin films in a multifilm, instead of high index of refraction inner film produces an anti-reflective coat that is very Tolerant to its overall thickness error. For example, when the substrate is SF57, and when only two materials, a high index and a low index of refraction material are alternated in a multifilm with the outside film of the lower index of refraction material, the ratio of the thicknesses of the high index of refraction films, $t_H$, to the thicknesses of the low index of refraction films, $t_L$ in the computation of the EIL is not very critical.

It is instructive to compare anti-reflective film calculations wherein the outer film index of refraction is 1.48+/−0.04, and the outer layer thickness is 1181.38+/−121.55.

Table 2 shows the total thickness of the EIL inner layer and the ratio the low index to high index thicknesses therein, for a substrate index of refraction of 1.84, as a function of EIL effective index of refraction.

TABLE 2

| EIL INDEX OF REFRACTION | EIL THICKNESS T ANGSTROMS | $t_L/t_H = r$ |
| --- | --- | --- |
| 2.30 | 240 | 0.00 |
| 2.29 | 245 | 0.02 |
| 2.28 | 250 | 0.03 |
| 2.27 | 256 | 0.05 |
| 2.26 | 262 | 0.06 |
| 2.25 | 268 | 0.08 |
| 2.24 | 275 | 0.10 |
| 2.23 | 282 | 0.11 |
| 2.22 | 290 | 0.13 |
| 2.21 | 296 | 0.15 |
| 2.20 | 304 | 0.17 |
| 2.19 | 312 | 0.19 |
| 2.18 | 321 | 0.21 |
| 2.17 | 331 | 0.23 |
| 2.16 | 341 | 0.25 |
| 2.15 | 352 | 0.27 |
| 2.14 | 363 | 0.30 |
| 2.13 | 375 | 0.32 |
| 2.12 | 388 | 0.35 |
| 2.11 | 403 | 0.37 |
| 2.10 | 418 | 0.40 |
| 2.09 | 435 | 0.42 |
| 2.08 | 455 | 0.45 |
| 2.07 | 476 | 0.48 |
| 2.06 | 500 | 0.51 |
| 2.05 | 528 | 0.54 |
| 2.04 | 560 | 0.57 |
| 2.03 | 601 | 0.60 |
| 2.02 | 658 | 0.64 |

Figure 2:
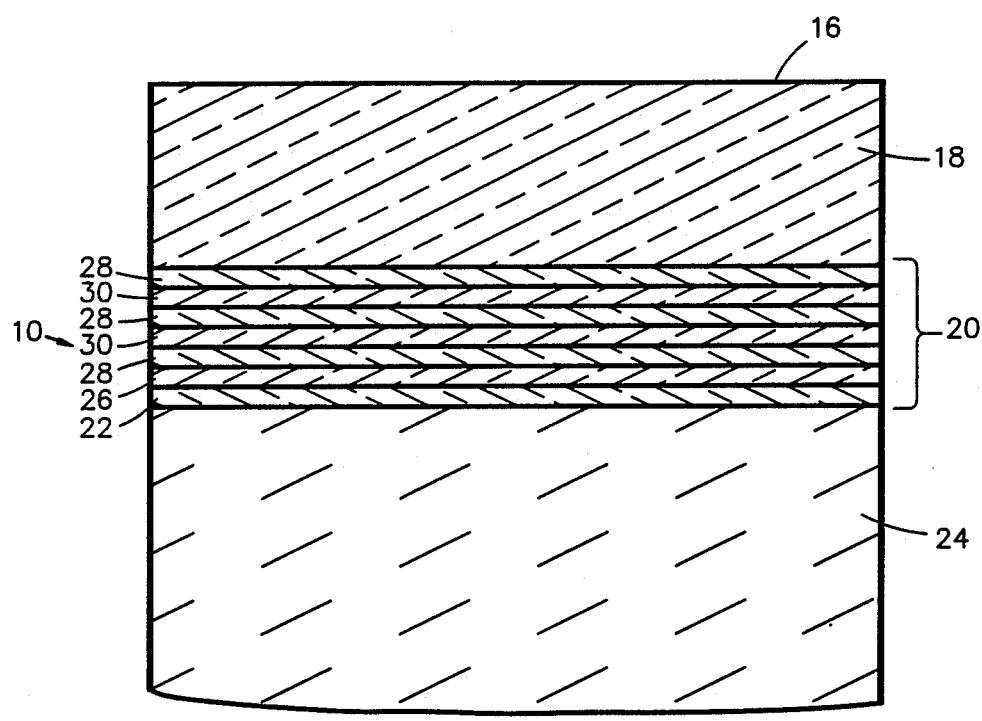
FIG. 2 shows a multifilm with exaggerated dimensions and a thick outer film.
Figure 3:
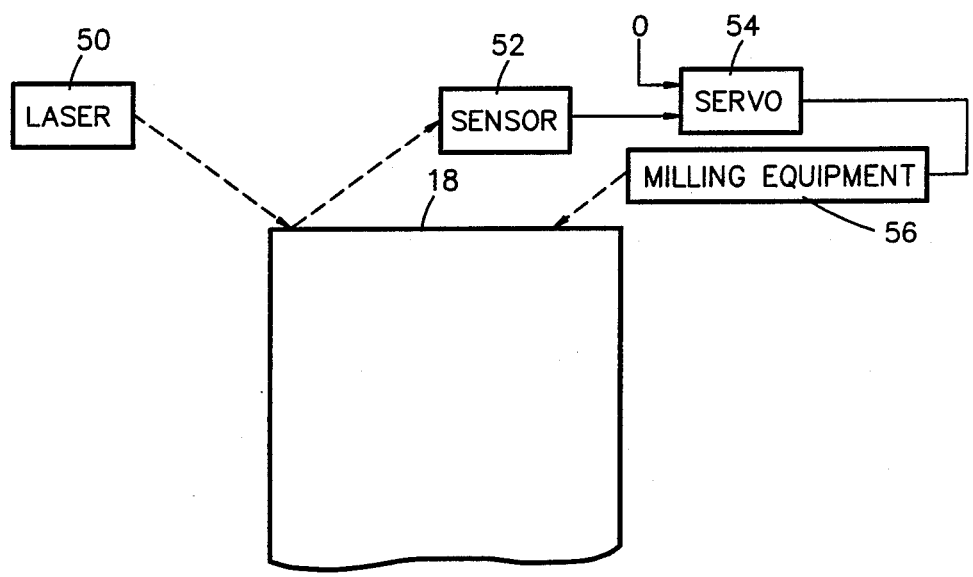
FIG. 3 is a block diagram of apparatus according to this invention for controlling the reflectivity of an anti-reflective coating.

As shown in FIG. 2, the film stack 20 may comprise, for example, a $TiO_2$ film 22 next to the substrate 24. The next film 26 outward from film 22 may be $SiO_2$. $TiO_2$ films 28 alternate with $SiO_2$ films 30. The outer layer is made over-thick so it may be milled down to exactly the correct thickness, according to this invention, to create an anti-reflective film.

In a practical situation, the outer film 18 is deposited thick enough that it can be milled. A laser beam, having the spectrum of the laser wherein the anti-reflective device is to be used, is directed from a laser 50 onto the film 18 in the region where the film 18 is being milled. The reflected laser beam enters the sensor 52 to produce an electrical signal. That signal is compared in a servo 54 to a zero signal, and the error signal is delivered to the milling equipment 56 to control such milling equipment.

In operation, the servo 54 directs the milling equipment, according to servo operation, to mill the surface 18 until a condition of no signal appears at the output of the sensor 52. The sensor 52 and the servo 54 may, if desired, stop the milling equipment 56 before the signal reaches zero but after it drops below a predetermined value. The servo 54 may also, if desired, change the speed of milling as the zero signal is approached.

Although the invention has been described above, it is intended that the invention shall be limited only by the appended claims.

I claim:

1. A method for making an anti-reflective dielectric multifilm, having an outer film of a first material with a known index of refraction and successive layers of second and said first materials, said second material having a known index of refraction higher than the index of refraction of said first material, on a substrate of known index of refraction comprising:

determining the desired predetermined effective index of refraction for the multifilm, said effective index having an increased tolerance to its thickness errors and being correctable for those thickness errors by reducing the thickness of its outer layer and creating a dielectric multifilm of more than two films having the correct ratio of thicknesses of its sub-layers to obtain the above-mentioned effective index of refraction on an optical substrate, with the outermost film, of said first material, having a thickness greater than its required thickness; and reducing the thickness of said outermost film of said created multifilm to compensate for total thickness error of both itself and said created multifilm to reduce the reflectivity of the multifilm.

2. An anti-reflective multifilm of alternate layers of first and second materials with said second material having a higher index of refraction that said first material, on a substrate, and made by the method recited in claim 1.

3. An anti-reflective multifilm on a substrate as recited in claim 2, wherein said first material is silica and said second material is titania.

4. A method for making an anti-reflective dielectric multifilm, having an outer film of a first material with a known index of refraction and successive layers of materials other than said first material, some of said materials other than said first material with a known index of refraction higher than the index of refraction of said first material on a substrate of known index of refraction comprising:

determining the predetermined effective index of refraction for the multifilm, said effective index having a reduce the sensitivity to its thickness errors and being correctable for those thickness errors by reducing the thickness of its outer layer;

creating a dielectric multifilm of more than two films on an optical substrate, having the correct ratios of thicknesses of its sub-layers to obtain the above-mentioned effective index of refraction and reduced sensitivity, and the outermost film being of said first material having a thickness greater than its required thickness; and reducing the thickness of said outer film of said created multifilm to compensate for total thickness error of both itself and said created multifilm to reduce the reflectivity of the multifilm.

5. An anti-reflective multifilm of a first material and of at least a second material having a higher index of refraction than said first material, on a substrate, and made by the method recited in claim 4.

6. An anti-reflective multifilm on a substrate, as recited in claim 5 wherein said first material is silica and said second material is titania.

* * * * *